April 23, 1946.　　　J. K. MORRIS　　　2,398,841

GEAR POWER UNIT

Filed March 1, 1943　　　2 Sheets-Sheet 1

INVENTOR.
JOHN K. MORRIS
BY
James M. Abbett
ATTY

April 23, 1946.   J. K. MORRIS   2,398,841
GEAR POWER UNIT
Filed March 1, 1943   2 Sheets-Sheet 2

INVENTOR.
JOHN K. MORRIS.
BY
James M. Abbett.
ATTY.

Patented Apr. 23, 1946

2,398,841

UNITED STATES PATENT OFFICE 2,398,841

GEAR POWER UNIT

John K. Morris, Los Angeles, Calif.

Application March 1, 1943, Serial No. 477,669

3 Claims. (Cl. 74—424.8)

This invention relates to a driving means and particularly pertains to a gear power unit.

In the operation of various types of mechanism it is desirable to provide a mechanical structure by which a rotating drive motion will be translated into a lineal movement of a driven member, and between which drive and driven elements a suitable power increase will be obtained. Such structures are of particular value at the present time for remotely controlling parts of airplanes, as for example the control flaps of the airplanes by which the wings are trimmed. In such structures an individual drive motor is provided, assembled with a housing within which a train of rotary gears is mounted and through which gears a reciprocating driven shaft is actuated, the motor circuit being controlled from the instrument panel of the airplane. In view of the fact that the motor and gear unit may be disposed at points remote from the control switch, and that the operation of the unit cannot be observed, it often occurs that the driving motor will be operating at high speed when the reciprocating driven shaft has reached the end of its stroke, with the result that the parts of the structure may be jammed or broken.

It is the principal object of the present invention to provide a gear power unit of compact and sturdy design embodying a driving motor, a driving gear set, and a reciprocating driven shaft, the structure including snubbing means to absorb the impact shock when the reciprocating element reaches the end of its stroke, and further acting to dissipate torque shock incident to the operation.

The present invention contemplates the provision of a housing including a train of rotary reduction gears operating a rotating shaft and a reciprocating element carrying a shackle connection at its outer end and by which a desired lineal motion may be imparted by movement of the reciprocating element.

The invention is illustrated by way of example in the accompanying drawings in which:

Fig. 4 is a fragmentary view in longitudinal section showing a modified form of buffer including anti-friction bearings.

Figure 1:
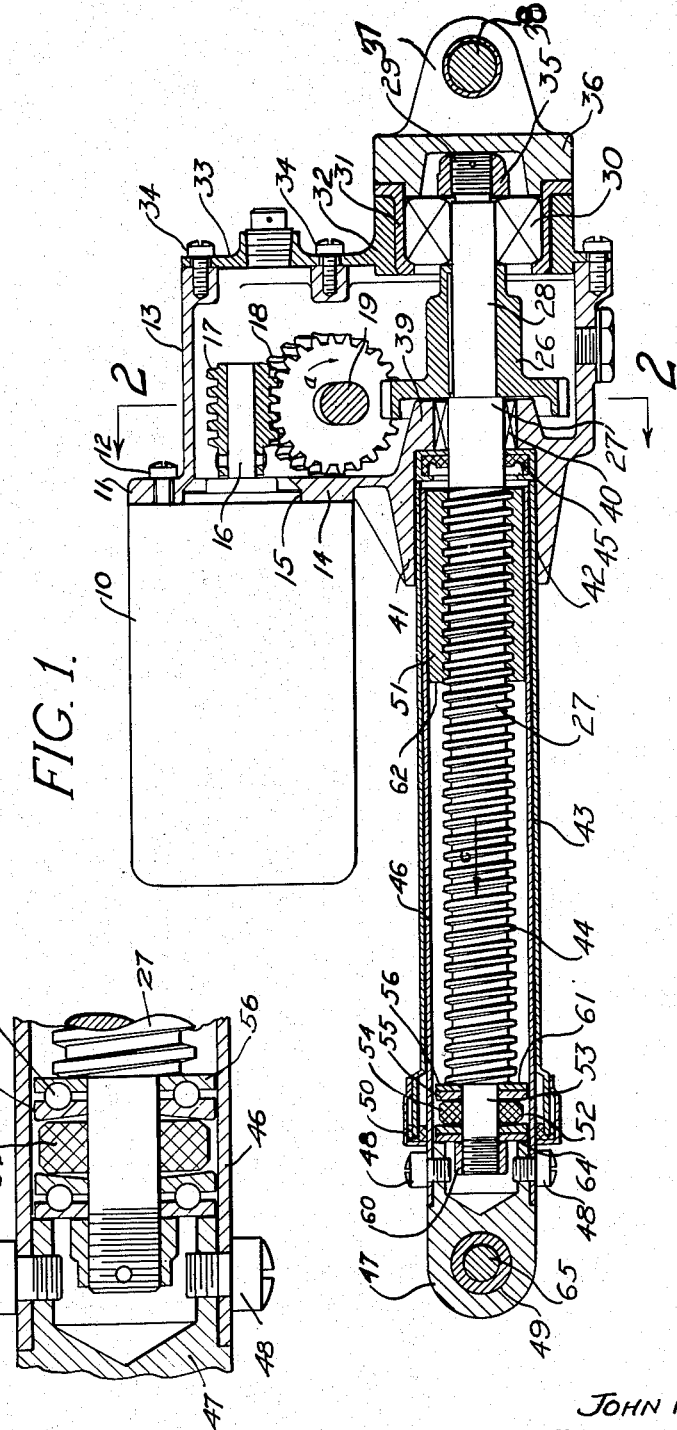
Figure 1 is a view in central longitudinal section through the gear power unit with which the present invention is concerned, and discloses the reciprocating driven member and the drive therefor.

Referring more particularly to the drawings, 10 indicates a driving motor. This motor is here shown as being an electric motor and it is of course controlled by a suitable electric circuit and electric switch. The switch is disposed at a point remote from the unit with which the present invention is concerned. It is understood that any other type of prime motor might be used if desired. The motor is mounted upon a bolting flange 11 and is secured in place by screws 12. The bolting flange is part of a gear case 13. This gear case has a forward wall 14 formed with an opening 15 through it in axial alignment with the motor 10. The drive shaft 16 of the motor extends through this opening and carries a driving pinion 17. This pinion is a worm which is in mesh with a worm wheel 18. The worm wheel 18 is mounted upon a shaft 19 which is disposed at an angle to horizontal, and thus makes it possible for the gear case 13 to be of unusually small dimensions while accommodating various gears to be hereinafter described. The shaft 19 is mounted at its uppermost end in a bearing 20 and at its lowermost end in a bearing structure 21. The bearing structure 21 is directly included within a cap 22 secured within a bore 23 of the housing 13 by cap screws 24. Mounted upon the shaft 19 or formed integral therewith is a worm 25. This is in mesh with a worm wheel 26. The worm wheel 26 is secured upon a longitudinally extending driven shaft 27.

The driven shaft 27 is here shown as disposed in the same axial plane with the drive shaft 16 and is parallel thereto. The shaft is of considerable length as compared with the length of the shaft 16 and the motor 10 and extends forwardly of the motor. For convenience in description only, it is to be understood that the motor 10 is disposed horizontally, and that the entire unit functions with the motor 10 and the shaft 27 lying in parallel horizontal planes. It is understood, however, that the unit may be disposed in any required position in actual operation.

The shaft 27 has a reduced portion 28 which terminates in a threaded end 29, and a suitable anti-friction bearing 30 is mounted on the reduced portion 28 and is carried within a cage 31. The cage 31 is mounted within a bearing portion 32 of a cover plate 33, which is secured to the gear case 13 by cap screws 34 and is disposed parallel to the front plate 14 of the gear case. The worm gear 26 is mounted upon the reduced portion of the driven shaft 27 and is keyed with relation thereto. A nut 35 engages the threaded end 29 of the shaft and supports the shaft with relation to the bearing 30.

Secured over the end of the bearing portion 32 of the cover plate 33 is a cap 36. This is formed with a lug 37 to receive pivot pin 38 by which a suitable connecting member (not shown) is attached to the gear case and either supports the case or provides an operating connection therewith.

The forward face 14 of the gear case 13 is formed with a tubular bearing portion 39 through which the shaft 27 extends. Anti-friction bearings 40 are mounted within this tubular portion and support the shaft. The position of these bearings is slightly in advance of the reduced portion 28 of the shaft.

Extending outwardly from the front face of the wall 14 of the gear case 13 is a boss 41. Secured firmly within the bore 42 of the boss is a tubular housing 43 which is rigidly supported in position and throughout the length of which a threaded portion 44 of the driven shaft 27 extends. At the inner end of the tubular housing 43 and within the bore 42 is an annular packing ring 45 which forms a fluid-tight seal around the driven shaft 27 and prevents leakage of the grease or other lubricant with which the gear case 13 is packed. Reciprocably mounted within the tubular housing and around the portion 44 of the driven shaft 27 is a thrust sleeve 46. This sleeve has a sliding fit in relation to the bore of the tubular housing 43. The outer end of the thrust sleeve receives a yoke 47 which is held in place by cap screws 48. This yoke is formed with a transverse bore 49 to receive a suitable connecting pin by which the yoke is attached to a device to be actuated, such for example as a wing flap (not shown in the drawings).

The outer end of the tubular housing is formed with a packing gland 50 which circumscribes the thrust sleeve 46 and forms a fluid seal therewith. The inner end of the thurst sleeve is formed with a tubular nut 51 which is secured to the sleeve by any suitable means, such as welding. This nut has a central threaded bore engaging threads on the section 44 of the driven shaft 27. Thus, as the shaft 27 is rotated the nut will move therealong and will simultaneously reciprocate the thrust sleeve 46. It will be evident that as the shaft 27 rotates to move the thrust sleeve 46 to the extreme end of its stroke in either direction, the shaft 27 may possibly continue to rotate and exert a longitudinal movement upon the thrust sleeve 46, since the circuit of the motor 10 may still be closed. In order to resist this movement a snubber structure is provided, as generally indicated at 52. This structure is mounted upon a reduced end portion 53 of the section 44 of the driven shaft 27 and includes a deformable washer 54 disposed between sets of washers 55 and 56.

The deformable element 54 is preferably made of some synthetic rubber, such as "neoprene." The washers 55, directly contacting the opposite sides of the "neoprene" disc or ring, are preferably formed of brass or bronze. The opposing faces of the washers 55 are concave, as indicated at 57, and the diameter of the washers 55 is greater than the diameter of the "neoprene" disc 54, for a purpose to be hereinafter described. The outer faces of the discs 55, as indicated at 58, are flat and in planes normal to the longitudinal axis of the shaft 27. Similar contiguous flat faces 59 are formed upon the discs 56. These discs are preferably made of steel, and the contiguous faces 58 and 59 are ground smooth. A film of grease is disposed between the contiguous faces 58 and 59 to facilitate in relative rotation of the discs 55 and 56. A nut 60 is threaded onto the outer end of the portion 53 of the shaft 27 and holds the members 54, 55 and 56 in assembled relation to each other upon the shaft. Attention is directed to the fact that the diameters of the discs 55 and 56 are larger than the diameter of the threaded portion 44 of the shaft 27, and that they are also larger than the outside dimensions of the nut 60. The innermost disc 56 thus presents an inner face 61 to end face 62 of the nut 51 which is assembled with the thrust sleeve 46. The outer face 63 of the outer disc 56 may be encountered by a stop face 64 formed as a part of the yoke 47, as shown in Fig. 1 of the drawings. It is to be understood that the connection between the yoke 47 and the member operated by the yoke, and which is attached by a pin 65, holds the yoke and the thrust sleeve 46 against rotation. This likewise acts to hold the nut 51 against rotation, so that rotation of the driven shaft 27 will impart longitudinal movement to the nut 51 and the thrust sleeve 46.

Figure 2:
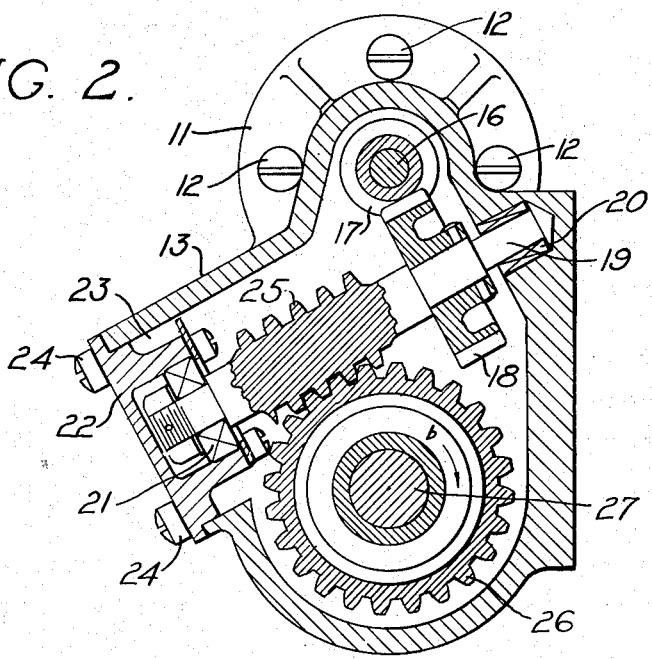
Fig. 2 is a view in transverse section through the housing of the structure showing the rotary gear train as seen on the line 2—2 in Fig. 1.
Figure 3:
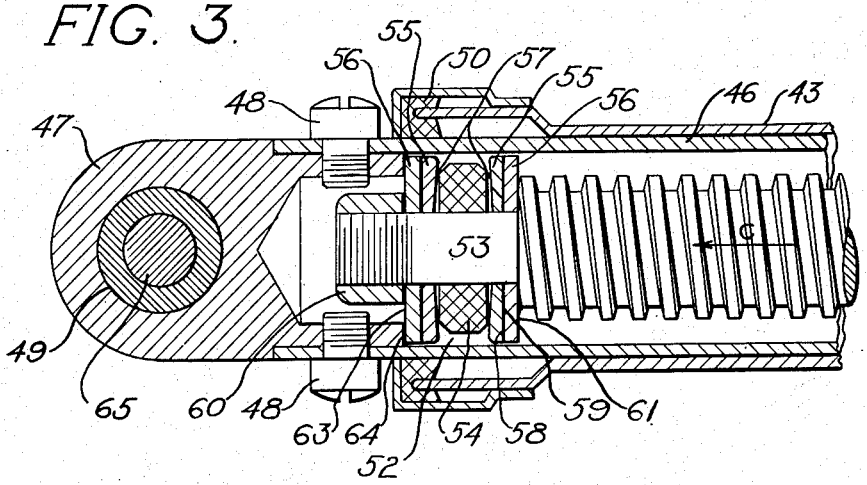
Fig. 3 is an enlarged fragmentary view in section and elevation showing the tubular case and the outer end of the operating connection through the reciprocating member.

When it is desired to use the device as here shown, the parts are built and assembled as described in the foregoing specification. Attention is directed particularly to Fig. 2 of the drawings, where it will be seen that since the shaft 19 is disposed obliquely to the vertical plane occupied by the shafts 16 and 27 and is not disposed in a position normal to this plane, the shafts 16 and 27 may be placed relatively close together, and the size of the gear case 13 may be reduced to a minimum, both as to dimensions and weight. After the structure has been assembled as shown, the motor 10 may be operated. This will impart rotation to the drive shaft 16 and the worm 17, which in turn will rotate the worm gear 18 in the direction of the arrow a, as shown in Fig. 1. The worm 25 will then be driven and will impart rotation to the worm wheel 26 in the direction of the arrow b, as shown in Fig. 2. As this takes place the threaded engagement of the portion 44 of the shaft 27 with the nut 51 will cause the thrust sleeve 46 to move outwardly in the direction of the arrow c, as shown in Fig. 1, and will project it from the end of the tubular housing 43. This action will continue until the end face or shoulder 62 of the nut 51 will encounter the face 61 of the steel washer 56. The tendency will thus be for the shaft to continue to rotate while the nut binds against the end face of the washer 56. Incident to this action the washers 55 and 56 will tend to rotate with relation to each other, thus dissipating the torque force of the driven shaft 27, and will also tend to deform the disc 54 which is positioned between the washers 55. In view of the fact that the disc 54 bears against concave faces 57 of the discs 55, there will be a tendency for the outer circumference of the disc 54 to be confined between the washers while causing the material of the member 54 to flow into the concave spaces as pressure is increased and the washer 54 is deformed. This tends to prevent the increase in diameter of the washer 54 and the tendency of the washer to overflow the space between the disc 55 and bind against the inner face of the thrust sleeve 46.

It is to be pointed out that a typical installation of this particular structure requires a motor 10 having a driving speed of 3500 revolutions per minute, and that the thrust and torque forces exerted between the shoulder 62 and the washer 56 is considerable. The structure here disclosed damps this force and prevents injury to the parts. When the driven shaft 27 rotates in a counter-direction to that indicated by the arrow *b* in Fig. 2, the thrust sleeve 46 will move in a counter-direction to the arrow *c* in Fig. 1. This will continue until the shoulder 64 on the yoke 47 abuts against the outer face 63 of the outermost disc 56. The same snubbing action will then be obtained as previously described.

Referring to Fig. 4 of the drawings, it will be seen that anti-friction bearings 55' are interposed between the discs 55 and 56.

It will thus be seen that by the structure here disclosed it is possible to provide a gear power unit within which rotary motion is converted into lineal motion by a compact, light weight, efficient gear set, and which structure insures that at opposite ends of the stroke of the thrust sleeve the force will be damped and the driven shaft brought to rest without damage to the parts of the unit.

While I have shown the preferred form of my invention as now known to me, it will be understood that various changes may be made in combination, construction and arrangement of parts by those skilled in the art, without departing from the spirit of my invention as claimed.

Having thus described my invention, what I claim and desire to secure by Letters Patent is:

1. In combination, a rotatable member and a member moving longitudinally thereof to describe a reciprocating stroke of fixed length, stop shoulders carried by the member moving longitudinally and being disposed adjacent to the opposite ends thereof to define said stroke length; a buffer structure mounted upon said rotatable member and rotatable relative thereto, said structure including a deformable disc interposed between a pair of rigid discs being adapted to alternately engage the stops on the longitudinally movable member at the opposite ends of the stroke of said longitudinally movable member.

2. In combination, a rotatable member and a member moving longitudinally thereof to describe a reciprocating stroke of fixed length, stop shoulders carried by the member moving longitudinally and being disposed adjacent to the opposite ends thereof to define said stroke length; a buffer structure carried by the rotatable member and being free to rotate around the axis thereof, said buffer structure including a pair of rigid discs freely rotatable upon said rotatable member and having limited longitudinal movement on their mounting, and a yieldable and compressible disc mounted upon the rotatable member and interposed between said first named discs in face contact, whereby said yieldable disc may be compressed and will frictionally resist relative rotation between the rigid and yieldable discs as one of these stops on the longitudinally movable member encounters one of the relatively rigid discs to bring the longitudinally movable member and the rotatable member to rest.

3. In a device of the character described, the combination of a rotatable screw shaft, a tubular member mounted thereon for longitudinal reciprocation, said tubular member being held against rotation, a nut threaded onto the shaft and fixed to the tubular member, whereby rotation of the shaft in opposite directions will produce alternate reciprocation of the tubular member, a cylindrical extension at the end of said threaded shaft, a pair of relatively hard metal discs rotatably mounted upon said extension, said discs being free to rotate with relation to the extension and to move longitudinally thereof, shoulders on the threaded shaft limiting longitudinal movement of the discs, a deformable buffer disc normally filling the space between said first named discs, and spaced shoulders on the longitudinally movable member between which the buffer is positioned and adapted to alternately encounter one of said pair of discs at each end of the stroke of said tubular member to frictionally engage the same and to tend to compress the buffer disc and set up friction between the faces of the discs while bringing both the longitudinal member and the rotatable member to rest.

JOHN K. MORRIS.